United States Patent [19]
Wilson

[11] Patent Number: 5,443,350
[45] Date of Patent: Aug. 22, 1995

[54] GOODS VEHICLE OR A TRAILER FOR A GOODS VEHICLE

[76] Inventor: Frederick G. Wilson, 49 Hillsborough Old Rd., Lisburn, County Down BT27 5EN, Northern Ireland

[21] Appl. No.: 194,490

[22] Filed: Feb. 10, 1994

[30] Foreign Application Priority Data

Feb. 10, 1993 [GB] United Kingdom ............... 9302602

[51] Int. Cl.⁶ .............................................. B60P 1/02
[52] U.S. Cl. ..................... 414/495; 410/14; 414/540
[58] Field of Search ............ 410/14, 15, 26, 28, 410/28.1, 29; 414/495, 679, 540; 105/375; 296/25, 181; 187/8.45; 280/405.1

[56] References Cited

U.S. PATENT DOCUMENTS

| | | | |
|---|---|---|---|
| 2,254,542 | 9/1941 | O'Brien | 410/14 |
| 2,694,597 | 11/1954 | Kunz | 410/28 X |
| 3,405,661 | 10/1968 | Erickson et al. | 410/29 X |
| 4,455,119 | 6/1984 | Smith | 410/28.1 X |
| 4,943,204 | 7/1990 | Ehrlich | 414/495 |
| 5,092,721 | 3/1992 | Prince | 296/25 X |
| 5,096,216 | 3/1992 | McCalla | 414/495 X |

FOREIGN PATENT DOCUMENTS

| | | |
|---|---|---|
| 0278558 | 1/1988 | European Pat. Off. . |
| 715692 | 12/1931 | France . |
| 2223260 | 10/1974 | France . |
| 2240122 | 3/1975 | France . |
| 2530558 | 1/1984 | France . |
| 2240902 | 2/1974 | Germany . |
| 56-50828 | 5/1981 | Japan ........................ 410/28 |
| 50178 | 2/1932 | Norway ....................... 410/14 |
| 1462116 | 4/1974 | United Kingdom . |
| 1467476 | 7/1974 | United Kingdom . |
| 1602738 | 5/1978 | United Kingdom . |
| 2242654 | 10/1991 | United Kingdom . |
| 2114941 | 1/1993 | United Kingdom . |
| WO80/01553 | 8/1980 | WIPO . |
| WO88/08385 | 11/1988 | WIPO . |

*Primary Examiner*—Michael S. Huppert
*Assistant Examiner*—Stephen Gordon
*Attorney, Agent, or Firm*—Woodock Washburn Kurtz Mackiewicz & Norris

[57] ABSTRACT

A goods vehicle has a body with upper and lower load-bearing floors and each mounted for vertical movement within the body. The upper floor is raised and lowered by a hoist. Telescopic links connect the two floors such that when the upper floor is less than a certain height above the lower floor it can move independently of the lower floor, but when the upper floor is lifted above such height it entrains the lower floor and the two floors move together. In another embodiment the two floors are fixed together for movement together over the full range of vertical movement of the upper floor.

6 Claims, 4 Drawing Sheets

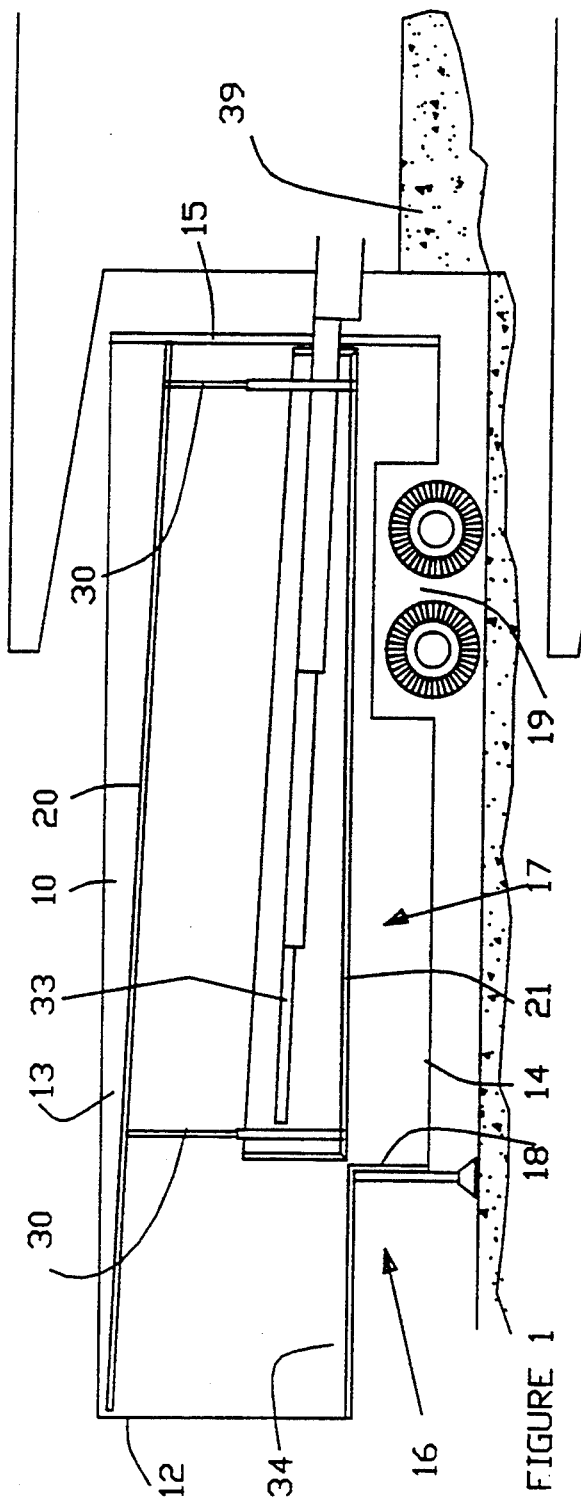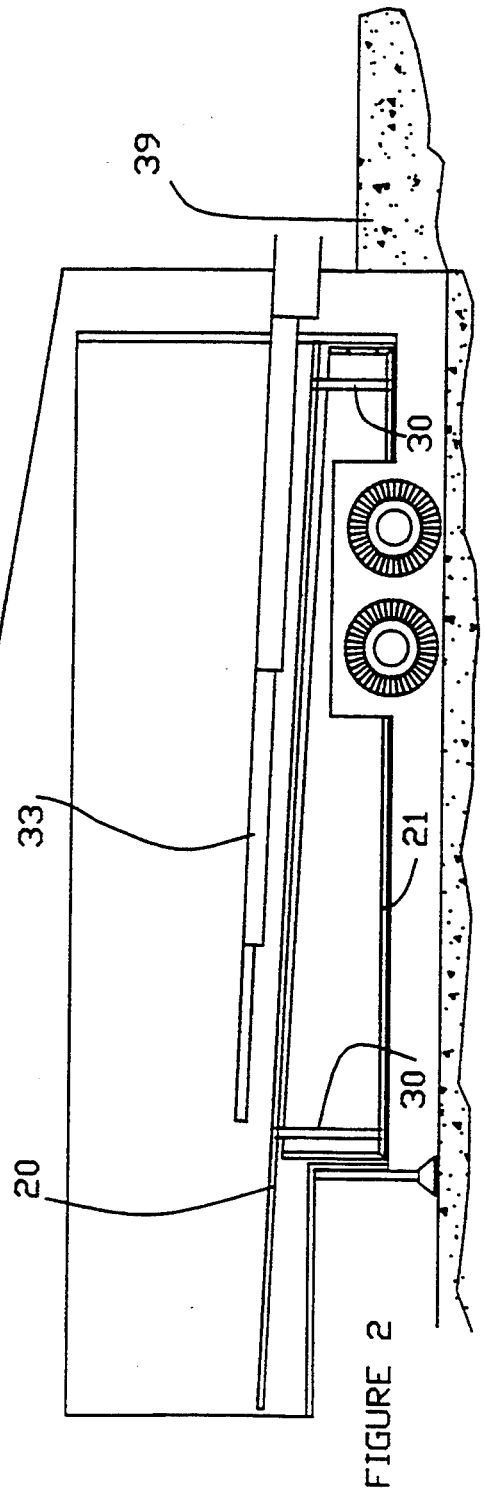

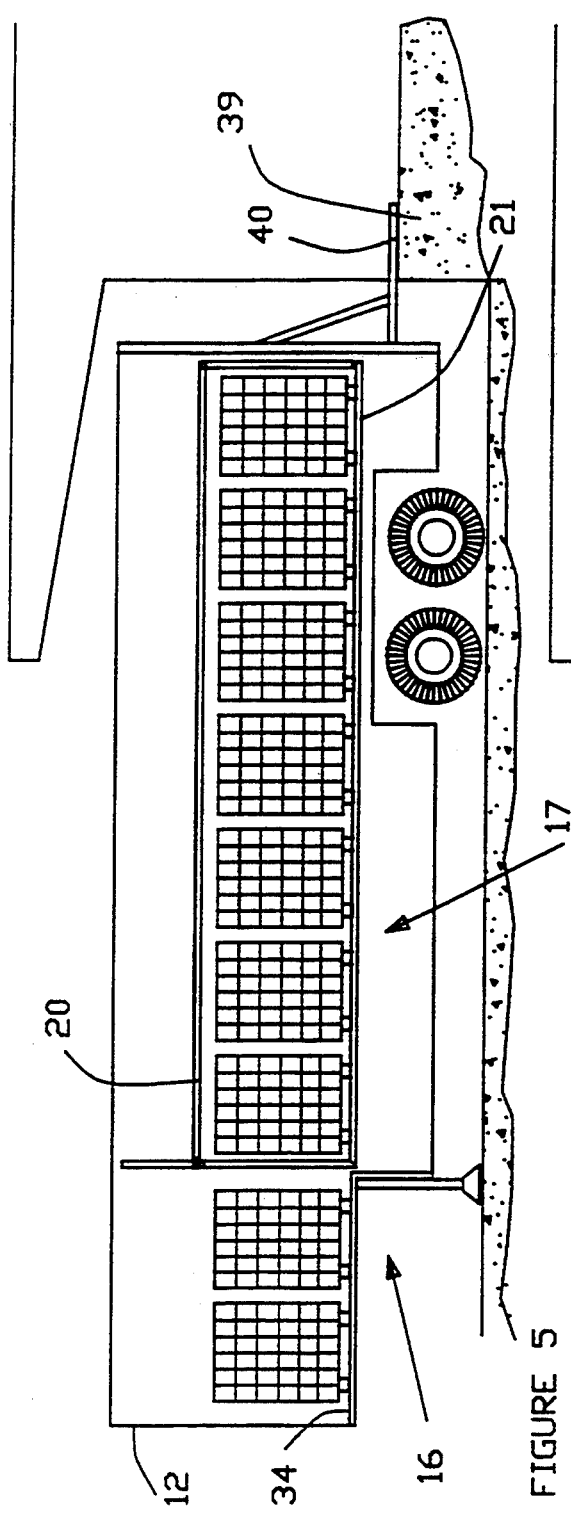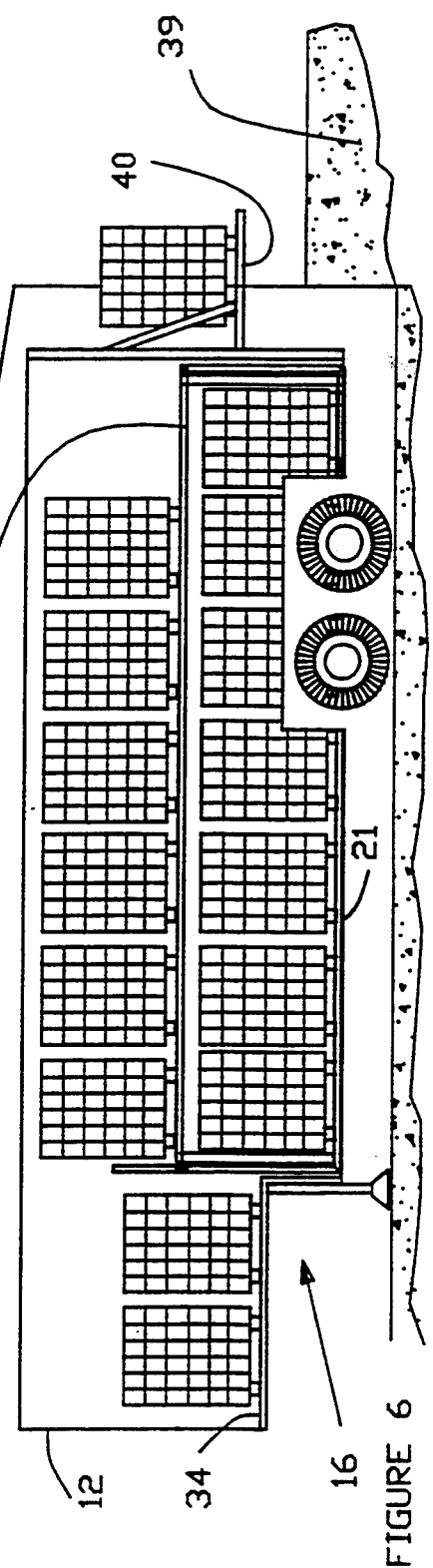
FIGURE 5
FIGURE 6

GOODS VEHICLE OR A TRAILER FOR A GOODS VEHICLE

TECHNICAL FIELD

This invention relates to a goods vehicle, or a trailer for a goods vehicle, having more than one internal load-carrying floor or deck. For the purpose of this Specification, the term "goods vehicle" will be used to mean both goods vehicles and trailers for such vehicles.

BACKGROUND OF THE INVENTION

A two-deck trailer is advantageous as it provides more floorspace to enable more products to be carried, and for many products the payload is increased by up to 65%. However, such a trailer is more difficult to load than a conventional trailer.

Modern warehouses have a floor level which is about the same height as a trailer floor, for example about 1200 mm above ground level. The loading dock may be a platform built outside the building to the same level as the internal floor, or it may be an opening in the wall of the building against which the rear of the trailer is reversed for loading or unloading.

To load a trailer with two fixed floors from a loading dock requires that the trailer is fitted with a lift gate to lower the product from the upper floor to the level of the loading dock and vice versa, or else to be loaded by a forklift or similar away from the loading dock.

Alternatively, an internal lift may be fitted allowing the trailer to be reversed against the loading dock but this means that the inward depth of the lift platform must be sacrificed from the rear of the upper fixed floor thereby losing load space.

If the lift gate is fitted externally then the trailer must be parked away from the loading dock by at least the length of the platform and is not desirable because it allows hot or cold outside air into the warehouse and also exposes the goods and the operating personnel to the weather.

Trailers with an upper floor capable of being raised and lowered by screw jacks or hydraulic rams are also known. This allows the trailer to carry variable height loads on the upper or lower floor but the same difficulties exist when loading or unloading both floors at a loading dock.

It is an object of this invention to provide an improved construction of goods vehicle.

SUMMARY OF THE INVENTION

Accordingly, the present invention provides a goods vehicle comprising a body with upper and lower load-bearing floors each mounted for vertical movement within the body, hoist means for lifting and lowering one of the floors, and coupling means operative such that at least over part of the range of vertical movement of the said one floor the other floor is supported by the one floor for vertical movement therewith.

In one embodiment the lower floor is rigidly connected to and supported by the upper floor for movement therewith over the full range of vertical movement of the upper floor. In this embodiment the two floors may first be raised to lift the lower floor from a position below the level of the loading dock approximately to the level of the loading dock, to permit the lower floor to be loaded. Then the two floors are lowered to bring the upper floor nearer to the level of the loading dock to permit it also to be loaded. A tail gate may be provided to raise and lower the goods the short distance between the dock and the upper floor.

In another embodiment the hoist means is arranged for lifting and lowering the upper floor, and the coupling means is operative such that when the upper floor is less than a certain height above the lower floor it can move independently of the lower floor, but when the upper floor is lifted above such height it entrains the lower floor and the two floors move together.

The advantage of this second embodiment is that due to the nature of the coupling means the upper floor is capable of moving downwardly towards the loading dock beyond a point at which the lower floor comes to rest, so that the upper floor can be brought more close to the level of the loading dock than would otherwise be the case.

The second embodiment of the invention is particularly but not exclusively useful for trailers used for the transport of parcels. Parcels are generally unloaded and loaded by telescopic conveyors. The conveyor usually is placed on the dock with the upper surface about 1 meter above dock level, with the conveyor generally extending towards the trailer front.

Conventional trailers generally have about 2.5 meters of headroom and stepframes 3 meters, but it is not physically possible for personnel to manually load or unload from this height. Further, health and safety legislation on manual handling within the E.C. disallows or discourages lifting to these heights.

It is possible to add an extension to existing conveyors to lower or raise the discharge height of the conveyor but this is very expensive.

The second embodiment of the invention overcomes this problem in that the upper floor may be raised until the lower floor approximates to the height of the conveyor and is then loaded to a pre-determined height. The conveyor then withdraws onto the dock and the upper floor is lowered until the lower floor comes to rest. However, the upper floor continues to descend until it is underneath the level of the conveyor. The upper floor is then loaded by conveyor and the floor may be locked in this position for transit.

BRIEF DESCRIPTION OF THE DRAWINGS

Embodiments of the invention will now be described, by way of example, with reference to the accompanying drawings, in which:

FIG. 1 is a schematic side view of a trailer according to a first embodiment of the invention placed at a loading dock with the lower floor raised approximately to the height of the dock and with a telescopic conveyor in position to load the lower floor;

FIG. 2 is a side view of the trailer with the lower floor resting on the bottom of the trailer and with the telescopic conveyor in position to load the upper floor;

FIG. 5 is a side view of a trailer according to a second embodiment of the invention showing the lower floor lifted approximately to the level of a loading dock for loading; and FIG. 6 is a side view of the trailer of FIG. 5 with the upper floor lowered to near the level of the loading dock.

DETAILED DESCRIPTION OF THE PREFERRED EMBODIMENT

Figure 3:
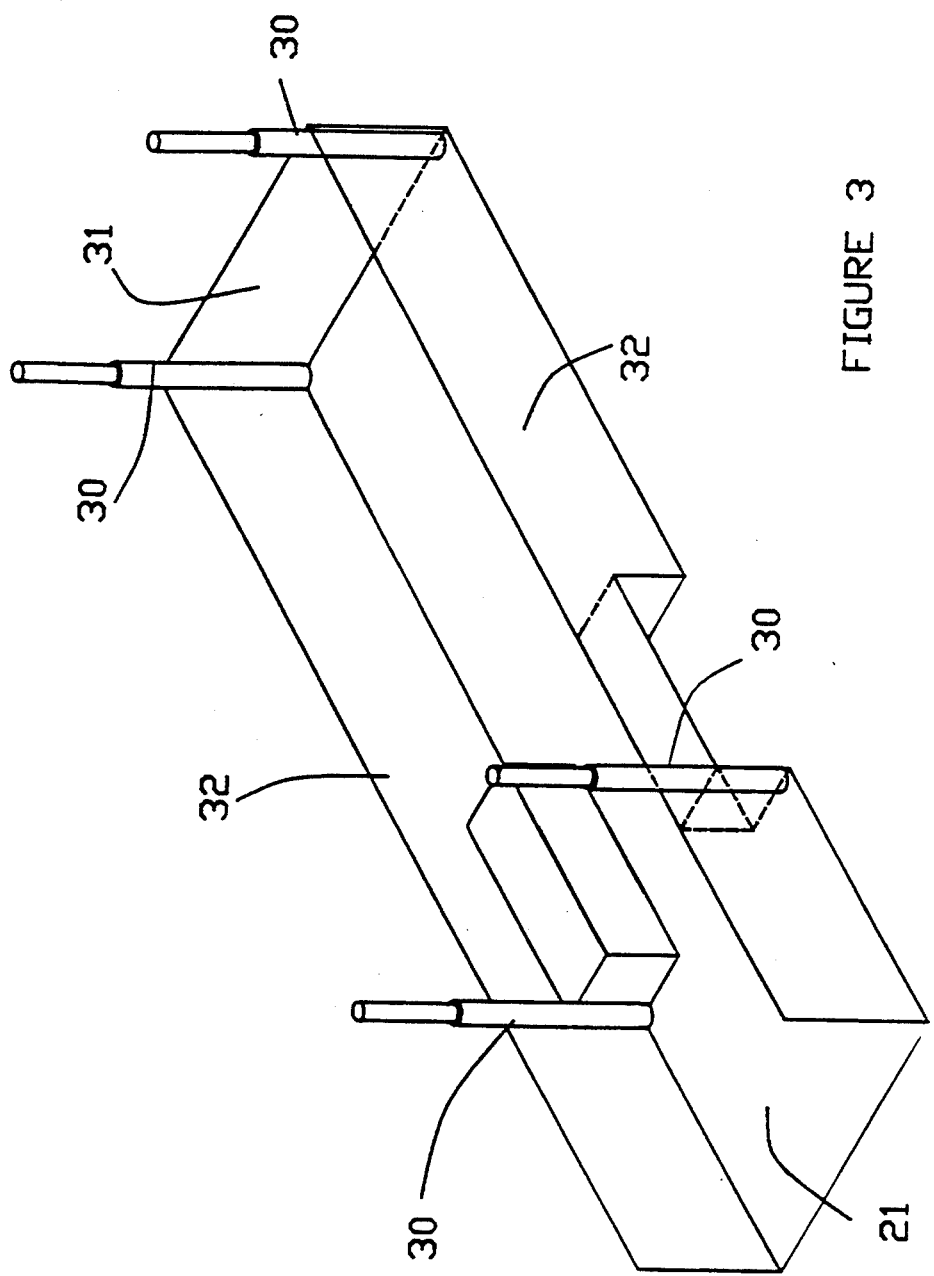
FIG. 3 shows the lower floor with the telescopic section which couple it to the upper floor.
Figure 4:
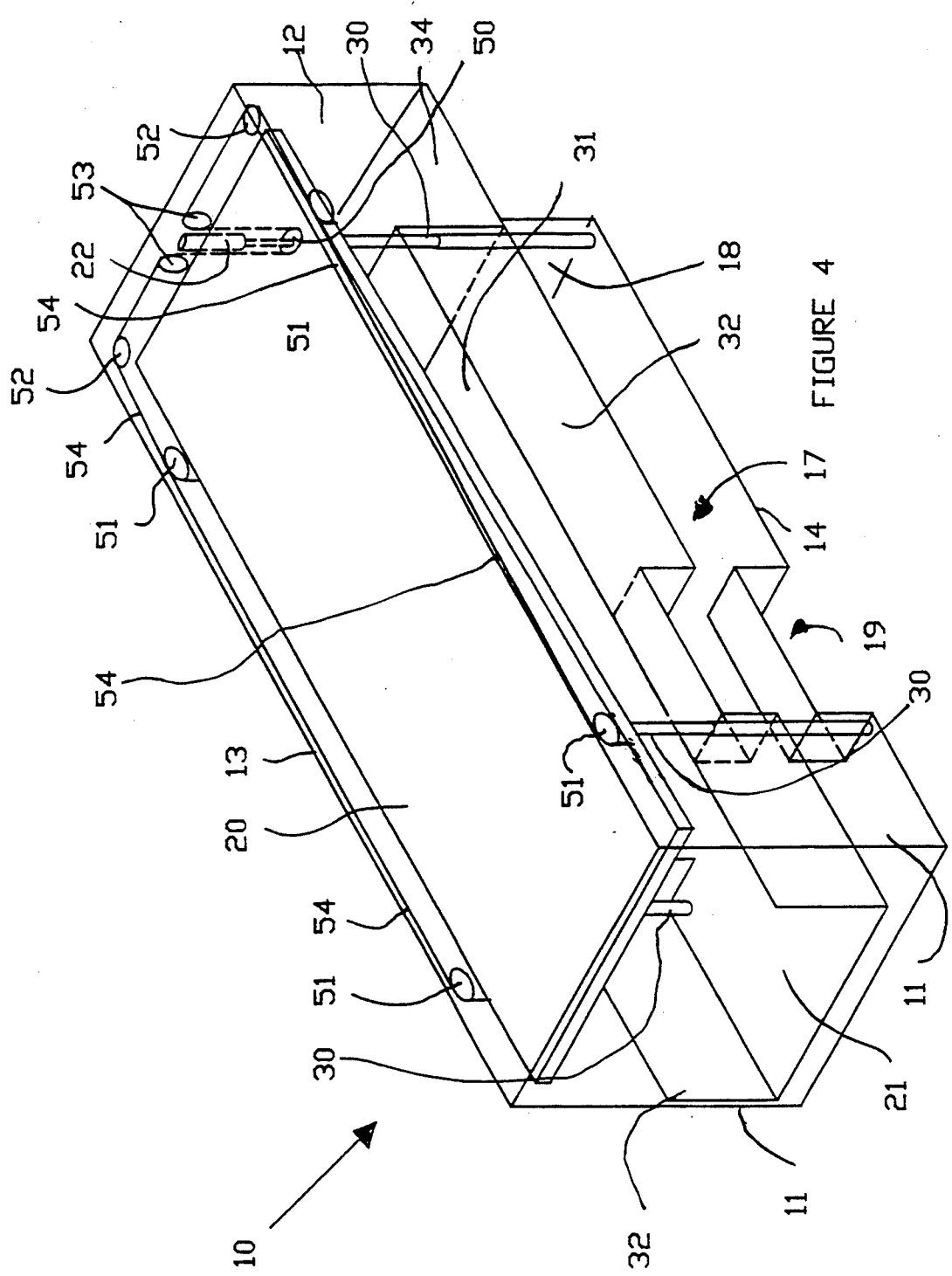
FIG. 4 is a perspective view of the trailer body showing the upper and lower floors in the positions corresponding to FIG. 1.

Referring to FIGS. 1 to 4 of the drawings, a trailer for an articulated goods vehicle has a body 10 with opposite side walls 11, a front bulkhead 12, a roof 13 and a base 14. The rear 15 of the body is closed by doors or a shutter or the like which can be opened to permit access to the interior of the body from the real. The body is built around a steel frame, so that the body panels do not need to be load bearing but only sufficient to keep out the weather. The trailer has a swan neck 16 for articulated connection to a driver's cab, so that a well 17 is formed at the bottom of the body 10 behind the lower bulkhead 18 and between the wheel arches 19.

Within the body, upper and lower load-bearing floors 20 and 21 respectively are guided for vertical movement within the body.

The upper floor 20 is movable between the position shown in FIG. 2 where it is approximately at the level of a loading dock 39, and the position shown in FIG. 1 where it is near the roof 13 of the body. The upper floor 20 is shown slightly inclined downwardly from front to rear, and it maintains this inclination during its vertical movement. However, it could be substantially horizontal like the lower floor Securing means (not shown) permit the upper floor to be locked at different heights in the body.

The lower floor 21 is movable between the position shown in FIG. 2 where it rests on the bottom of the trailer body within the well 17 and is supported there by the steel frame of the body 10, and the position shown in FIG. 1 where it is supported at the top of the well 17 approximately at the level of the loading dock 39. As seen especially in FIG. 4, the lower floor 21 has a front wall 31 and side walls 32 which define, with the lower floor 21, a tray whose external dimensions are approximately the same as the interior dimensions of the well 17.

The movement of the two floors is effected by a hoist which comprises a system of pulleys operated by one single-acting hydraulic ram 22 with double purchase mounted on the bulkhead 12. The cylinder of the ram 22 is fixed vertically in the center of the front bulkhead 12 with its piston rod extending downwardly, and the free end of the piston rod carries a pulley 50. Four pulleys 51 are mounted two on each side of the interior of the trailer body near the top, a further pulley 52 is mounted in each front corner of the body, and two more pulleys 53 are mounted on the bulkhead one on each side of the top end of the ram cylinder.

Four cables 54 are attached to the edges of the upper floor 20 each at a point below a respective pulley 51. Each cable 54 passes up and around the respective pulley 51, forwardly along the interior of the body to the corner pulley 52 on the same side of the body, around the latter towards the pulley 53 on the same side of the ram 22, around the latter and down to the pulley 50, and finally around the latter and up to a clamping point alongside the ram cylinder.

Thus, when hydraulic fluid is pumped into the ram cylinder behind the piston the piston rod is extended, such that the pulley 50 is pushed downwardly and the four cables 54 will be drawn towards the front of the trailer body to raise the upper floor 20. When the hydraulic fluid is released the weight of the upper floor 20 will force the piston rod back into the cylinder to draw the cables 54 away from the front of the body.

The lower floor 21 has four extendable links in the form of vertically extending telescopic sections 30. Each such link 30 is fixed at its lower end to the lower floor 21 and at its upper end to the underside of the upper floor 20. When the upper floor 20 is less than a certain height above the lower floor 21 resting at the bottom of the well 17 the links 30 are not fully extended and the telescopic sections may slide within one another to accommodate a variable distance between the upper and lower floors. Thus, the upper floor can move independently of the lower floor.

However, when the upper floor 20 is lifted by the hoist above the height at which the links 30 reach their maximum extension the lower floor 21 is entrained by the upper floor 20 and lifted upwardly away from its rest position. Thereafter the two floors will move together until the lower floor 21 is again brought to rest at the bottom of the well 17 whereupon further downward movement of the upper floor 20 will cause the links 30 to collapse or telescope within themselves so that once again the upper floor moves independently of the lower floor.

In use, when an empty trailer is to be loaded up it is parked with its rear against the loading dock 39 and the upper floor 20 is raised until it nears the roof 13, as seen in FIG. 1. In this position the links 30 are fully extended so that the upper floor 20 has lifted the lower floor 21 approximately to the level of the dock. Now a conventional telescopic conveyor 33 is inserted into the body 10 and the lower floor 21 is loaded. The platform 34 above the swan neck 16 can also be loaded in this position of the floors. To permit this, the front wall 31 is hinged along one vertical edge to the adjacent side wall 32 so that it can be swung towards the rear of the trailer body in the manner of a gate.

Next the telescopic conveyor 33 is withdrawn onto the dock and the upper floor 20 is lowered to and beyond the point at which the lower floor 21 comes to rest at the bottom of the well 17 so as to bring the upper floor approximately to the level of the dock 39, as seen in FIG. 2. Now the conveyor 33 is inserted into the body 10 over the upper floor 20 and the latter is loaded. Finally, the upper floor 20 is locked in this position for transit. The process for unloading a loaded trailer is essentially the reverse of the process described above.

Of course, if the nature and quantity of the load to be transported permitted, the upper floor 20 of the trailer could be locked in the lower position shown in FIG. 2 and the trailer used as a conventional single deck trailer.

Various modifications of the foregoing are possible. For example, instead of using telescopic sections the links 30 could be chains which become taut when the upper floor 20 moves above a certain height above the lower floor 21, and which become slack when the lower floor is resting at the bottom of the well 17. Alternatively, the links 30 could be provided by rigid arms upstanding from the lower floor 21, such arms having hooks at their upper ends which engage and are entrained by the upper floor when the latter moves a certain height above the lower floor corresponding to the length of the arms.

In a second embodiment of the invention, FIGS. 5 and 6, the lower floor 21 is rigidly connected to and supported by the upper floor 20, for example by rigid struts or the like, so that the lower and upper floors move together over the full range of vertical movement of the upper floor 20. As in the first embodiment, the upper floor 20 is raised and lowered by a hoist comprising a system of pulleys operated by a single-acting hydraulic ram with double purchase mounted on the bulkhead 12. Also, again like the first embodiment, the lower floor 21 has front and side walls (not shown in FIGS. 5 and 6) which define a tray fitting into the well 17.

To load the trailer the upper floor 20 is first raised to bring the lower floor 21 approximately to the level of the loading dock 39. This permits the lower floor 21 and the platform 34 above the swan neck 16 to be loaded directly from the dock, greatly reducing the loading time.

The upper floor 20 is now lowered until the lower floor 21 comes to rest at the bottom of the well 17. The upper floor 20 is still higher than the level of the loading dock, but a tail gate 40 may be provided to lift the goods the short distance from the dock 39 to the upper floor 20. As the lift gate 40 need not descend to ground level, it extends onto the dock or into the building, allowing the trailer to be parked against the dock or building to permit the personnel to work under cover.

Although in the preceding embodiments the upper floor 20 is lifted and lowered by a hoist which comprises a system of pulleys operated by one single-acting hydraulic ram, the hoist can be any suitable electrical/mechanical/hydraulic or other device capable of lifting and lowering the upper floor 20.

It is to be understood that while the embodiments of the invention have been described in relation to a detachable trailer for a goods vehicle, the invention is equally applicable to goods vehicles in which the body is a permanent and integral part of the vehicle.

I claim:

1. A goods vehicle trailer comprising:
   a body defined by a roof, a base, sidewalls and a front bulkhead,
   wheels at opposite sides of the body upon which the body is mounted, the base of the body being below the top of the wheels with the wheels being accommodated in wheel arches on the opposite sides of the body and the front bulkhead having upper and lower portions defining a swan neck, whereby a well is formed behind the lower portion of the front bulkhead and between the wheel arches,
   upper and lower load-bearing floors each mounted for vertical movement within the body, the lower floor having sidewalls which define with the lower floor a tray whose external dimensions are approximately the same as the interior dimensions of the well, the lower floor having a rest position substantially at the bottom of the well,
   hoist means for lifting and lowering the upper floor, and
   coupling means operative such that when the upper floor is less than a certain height above the lower floor it can move independently of the lower floor which remains in its rest position within the well, whereas when the upper floor is lifted above such height it entrains the lower floor upon continued lifting of the upper floor so that the lower floor is lifted in its entirety away from the bottom of the well.

2. A goods vehicle as claimed in claim 1, wherein the hoist means comprises a pulley system operated by a single-acting hydraulic ram mounted on the bulkhead.

3. A goods vehicle as claimed in claim 1, wherein the coupling means comprise extendable links.

4. A goods vehicle as claimed in claim 3, wherein the hoist means comprises a pulley system operated by a single-acting hydraulic ram mounted on the bulkhead.

5. A goods vehicle as claimed in claim 3, wherein the extendable links comprise telescopic sections.

6. A goods vehicle as claimed in claim 5, wherein the hoist means comprises a pulley system operated by a single-acting hydraulic ram mounted on the bulkhead.

* * * * *